March 16, 1971   J. E. HICKEY   3,570,145
TEACHING AID
Filed Jan. 24, 1969
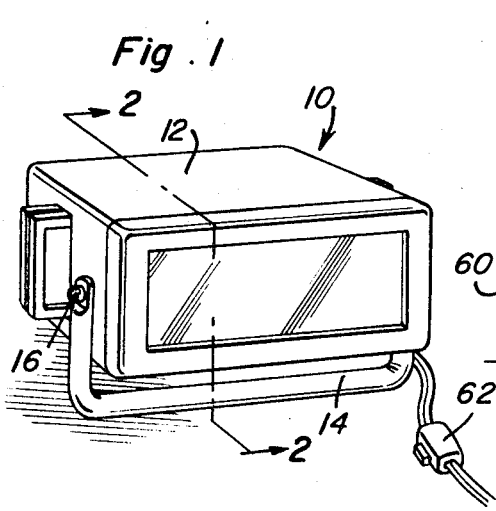
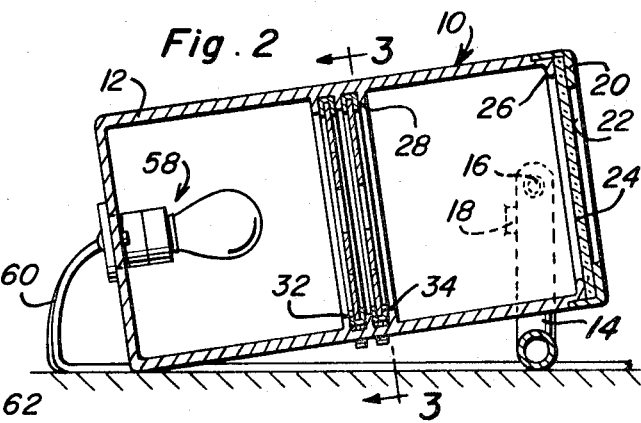
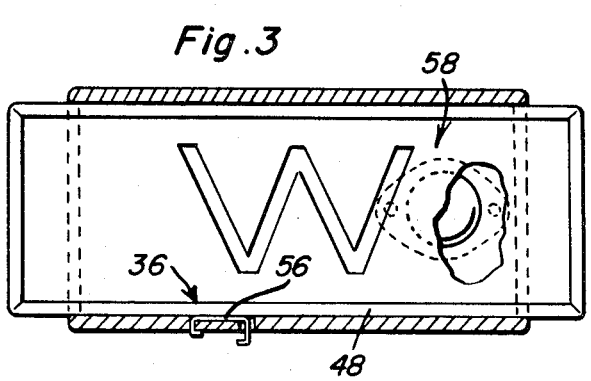
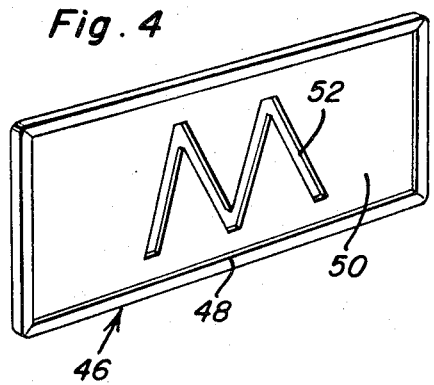
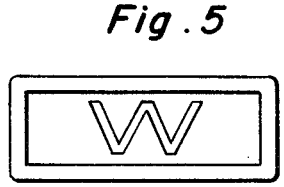
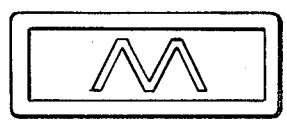
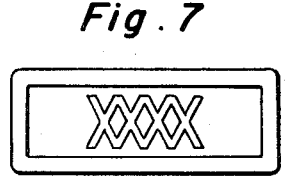
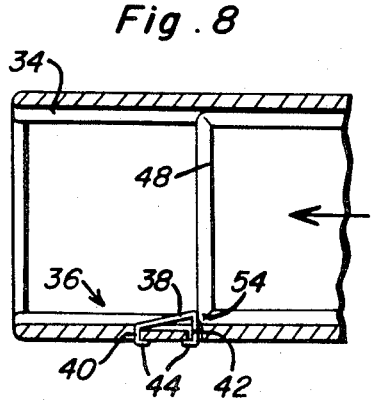
Joseph E. Hickey
INVENTOR.

United States Patent Office

3,570,145
Patented Mar. 16, 1971

3,570,145
TEACHING AID
Joseph E. Hickey, 174 Eaton Ave.,
Meriden, Conn. 06450
Filed Jan. 24, 1969, Ser. No. 793,653
Int. Cl. G09b 17/00
U.S. Cl. 35—35      4 Claims

ABSTRACT OF THE DISCLOSURE

A teaching aid including a slide viewer having two slide tracks in the interior of the viewer thereby permitting the insertion of two overlying indicia bearing slides or cards. Character or word recognition is tested and practiced by having a student insert a second card, identical to a first positioned card so that congruity is effected. Gate means is mounted in each track so that the cards are insertable in one direction only.

---

The present invention relates to teaching aids and more particularly to a combination of a viewer and indicia bearing cards for teaching and perfecting character recognition.

The fundamental purpose of the present invention is corrective and motivational in nature, and is particularly well adapted to teach and perfect character recognition by pupils, in need of remedial reading. Certain of these pupils suffer from a disabling condition often referred to as "reversal tendencies." This difficulty among pupils is usually discussed in terms of "visual discrimination." The condition manifests itself when the pupil reverses certain letters or words, either horizontally or vertically. Thus, by way of example, a letter such as "W" might be vertically reversed to appear as "M." Likewise, a word such as "saw" may be read as "was." The causes of such tendencies are generally thought to result from improper eye movement and/or poor visual muscular control wherein the pupil attempts to acclimate himself to read from right to left, instead of the conventional reading direction from left to right. In the past, methods have evolved for strengthening or training a pupil in visual discrimination of letters and words, such techniques usually being imposed on the pupil in the primary grades. Unfortunately, many students with chronic reversal problems are discovered in junor and senior high school. Because the prior art methods and materials available for work in visual discrimination is geared to the pre-primary level, it becomes virtually impossible to motivate the older remedial student in this area.

The present invention is a teaching aid which is designed to meet the deficiencies of the prior art and overcome them by presenting older remedial students with a teaching aid which will challenge them and encourage practice. The invention assumes the basic form of a slide viewer which is utilized in conjunction with overlying tarnsparent or translucent indicia bearing slides or cards having identical symbols. The object of the teaching aid is to teach the pupil to insert a second indicia bearing card in overlying relation with a first inserted card so that congruity is effected. Inasmuch as the present invention is not a toy, it is acceptable to the older student. Further, means are provided in the invention so that indicia bearing cards constituting study material must be inserted from left to right, the conventional reading direction. Accordingly, the present device affords practice in proper eye movement for correcting the cause of the condition leading to reversal tendencies. Further, the manipulative nature of the study material provides the necessary training in muscular coordination.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view illustrating the present teaching aid.

FIG. 2 is a transverse sectional view taken along a plane passing through section line 2—2 of FIG. 1.

FIG. 3 is a sectional view taken along a plane passing through section line 3—3 of FIG. 2 illustrating an indicia bearing card inserted in the teaching aid.

FIG. 4 is a perspective view illustrating a typical form of indicia bearing card.

FIG. 5 is a front elevational view of the window in the teaching aid wherein the letter "W" is inserted for viewing.

FIG. 6 is a view similar to that of FIG. 5 wherein the letter "M" is inserted within the teaching aid.

FIG. 7 is a view similar to FIG. 6 wherein the letter "W" and the letter "M" have been inserted in overlying relation thereby indicating a meaningless symbol, indicating that the student has inserted respectively inverted indicia into the teaching aid.

FIG. 8 is a partial sectional view illustrating a gating means for ensuring undirectional passage of an indicia bearing card into the teaching aid.

Referring to the drawings and more particularly FIGS. 1 and 2, the present teaching aid is generally indicated by reference numeral 10 and is seen to include a device similar to conventional slide viewers. In particular, the teaching aid includes a housing 12 having a pivotally mounted U-shaped rail member 14 which can serve as a carrying handle or when displaced in an underlying position serves as a means for elevating the forward viewing portion of the housing 12. The rail member is suitably mounted at the outward ends thereof to the housing by means of pivot point fasteners 16. A limit stop 18 is formed on each lateral side of the housing to limit displacement of handle 14 to substantially vertically erected position as seen in FIG. 1 and FIG. 2.

As will be seen by viewing FIG. 2, the forwardly oriented end of housing 12 is open and mounted thereon a frame 20 includes a rectangular viewing aperture 22 therein. A translucent glass or plastic sheet 24 is retained by the interior contacting surface of frame 20 along one peripheral edge of the translucent plate. The opposite surface of the translucent plate is supported by a peripheral flange 26 appending downwardly from the forward end of housing 12. Thus, the translucent plate 24 is secured in position and serves as a viewing window.

A flange assembly 28 extends inwardly from the upper and lower interior surfaces of housing 12. The flange assembly includes two parallel track assemblies 32 and 34 disposed in parallel overlying relation. The track assembly more particularly includes track members mounted within the flange assembly 28 on the upper and lower interior surfaces of the housing 12. The purpose of the track assembly is to permit insertion and withdrawal of indicia bearing cards which are viewed through the translucent plate 24 as hereinafter explained.

Gating means is provided in each track assembly for ensuring that indicia bearing cards can be inserted only in a unidirectional manner, more particularly from left to right. The purpose of the gating means is to aid remedial stndents in improving small muscle coordination and developing a preference for the left-to-right direction, the conventional reading direction. In particular, the gating means 36 can be characterized as a spring clip having an upwardly inclined bight portion 38 which appends at opposite ends thereof invertical arm portions 40 and 42 passing through apertures formed in the base of the housing. The outward ends of the spring clip are turned inwardly as indicated by 44 for securing the clip to the housing. In essence, the spring clip may be considered as a camming member which is flexibly displaceable when an indicia bearing card rides over the camming surface in the left-to-right direction, as seen in FIG. 3. However, as FIG. 8 illustrates, when a card is inserted from the right-to-left direction along the track assemblies 32 or 34, the spring clip prevents full insertion of the card within the viewer.

FIG. 4 illustrates a typical indicia bearing slide or card generally indicated by 46. As indicated, the letter "M" 52 is cut in a translucent or transparent plate 50. The plate is enclosed within a rectangular frame 48. Of course, as will be appreciated, the indicia or letter may be formed by conventional printing or photographic techniques.

To more fully appreciate the purpose of the spring clip or gating means 36, FIG. 8 illustrates the attempted insertion of an indicia bearing card into the viewer from the right to the left direction. As indicated by reference numeral 54, the lower corner of frame 48 abuts the raised edge of camming surface 38 so that full passage of the indicia bearing card along the track assembly 34 is precluded. In marked contrast, FIG. 3 illustrates the withdrawal of spring clip 36, which occurs when the card is properly inserted, so that the camming surface lies flush with the interior surface of the housing base as indicated by 56.

Referring to FIG. 2 and FIG. 3, it will be seen that a lamp assembly 58 is mounted along the rear panel of housing 12. It is contemplated that the assembly be attached in an offset manner with respect to the center of the translucent plate 24 thereby effecting a more even light distribution of an indicia on a card. As illustrated, the lamp assembly is energized by an electrical power cord 60 having an "on-off" switch 62 connected in series therewith. However, the lamp assembly can be connected to several batteries in which case the teaching aid becomes more portable and less prone to electric shock hazards.

Referring to FIGS. 5–7, a typical operation utilizing the present invention is illustrated. In FIG. 5, the letter "W" is placed within the teaching aid and appears through the viewing window or translucent plate 24. FIG. 6 illustrates the potential inverted placement of the letter "W" in the second track of the teaching aid wherein the result of the overlying disposition of the letters "W" and "M" results in the meaningless indicia which would appear through the viewing window as seen in FIG. 7. In such an instance, the student is encouraged or motivated to correct his mistake so that the overlying indicia are disposed in congruity. With sufficient practice, the remedial pupil developes muscular coordination and a resultant ability which corrects his invertion tendencies.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A teaching aid comprising a housing having a pair of opposed side walls, a viewing window formed on one end of the housing, a plurality of horizontal track means extending across the interior of the housing in parallel relation to the window, the track means being adapted to hold indicia bearing cards in overlying relation, a first plurality of card entrance-ways formed in one of said side walls, equal in number and aligned with each of said track means to permit cards to be inserted in said track means from a first direction, and a second plurality of card entranceways formed in the other side wall equal in number and aligned with each of said track means, said second plurality of card entranceways having means for preventing said cards to be inserted in said track means from said second direction, thereby conditioning the user to insert cards in the allowable direction only, the inserted cards having indica being viewable through the window.

2. The device set forth in claim 1 together with lighting means located interiorly of the housing for directing light through the cards and the window thereby illuminating the indicia on the cards.

3. The device set forth in claim 2 together with means for elevating the window end of the housing to permit a downwardly inclined line of sight by a viewer.

4. The device set forth in claim 3 wherein each gating means is mounted in a respective track means and includes a spring clip having a camming surface which operates to block passage of a card in a first direction and permits free passage in an opposite direction.

References Cited

UNITED STATES PATENTS

| | | | |
|---|---|---|---|
| 1,159,681 | 11/1915 | Kastner | 40—79X |
| 2,105,008 | 1/1938 | Riley | 35—28 |
| 2,720,045 | 10/1955 | Miller | 40—63(A) |
| 3,023,669 | 3/1962 | Hall | 40—79X |
| 3,172,215 | 3/1965 | Ragen | 35—35 |

WILLIAM H. GRIEB, Primary Examiner